(12) United States Patent
Devall

(10) Patent No.: US 6,561,211 B2
(45) Date of Patent: May 13, 2003

(54) FUEL TANK VENT CONTROL VALVE

(75) Inventor: Jeffrey Devall, Aberquenny (GB)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/039,356

(22) Filed: Oct. 18, 2001

(65) Prior Publication Data

US 2002/0062861 A1 May 30, 2002

Related U.S. Application Data

(60) Provisional application No. 60/241,676, filed on Oct. 19, 2000.

(51) Int. Cl.[7] .............................................. F16K 24/04
(52) U.S. Cl. ..................................... 137/202; 137/493.8
(58) Field of Search .............................. 137/202, 493.8

(56) References Cited

U.S. PATENT DOCUMENTS

| | | | | |
|---|---|---|---|---|
| 4,000,828 A | * | 1/1977 | Crute et al. .................. 137/202 |
| 4,742,844 A | | 5/1988 | Szlaga ..................... 137/493.2 |
| 4,760,858 A | | 8/1988 | Szlaga .......................... 137/43 |
| 4,816,045 A | | 3/1989 | Szlaga et al. .................. 55/168 |
| 5,156,178 A | | 10/1992 | Harris .......................... 137/43 |
| 5,402,818 A | * | 4/1995 | Kasugai et al. ............. 137/202 |
| 5,449,018 A | * | 9/1995 | Harris ..................... 137/493.9 |
| 5,582,198 A | * | 12/1996 | Nagino et al. ............... 137/202 |
| 5,666,989 A | | 9/1997 | Roetker ........................ 137/43 |
| 5,687,778 A | | 11/1997 | Harris .......................... 141/59 |
| 5,749,347 A | * | 5/1998 | Torii et al. .................. 137/202 |

* cited by examiner

*Primary Examiner*—Gerald A. Michalsky
(74) *Attorney, Agent, or Firm*—Barnes & Thornburg

(57) ABSTRACT

A vent valve for use with a fuel containing system including a fuel tank and a vapor recovery system. The vent valve includes a housing which communicates with the fuel tank and the vapor recovery system. The housing defines a path between the fuel tank and vapor recovery system. A float valve is positioned in the housing and is responsive to the presence of fuel in the tank. The housing has at least one vacuum vent positioned in the path. An umbrella valve is carried on the housing and positioned between the fuel tank and the vapor recovery system. The umbrella valve has a wall defining an orifice extending therethrough and a cover portion extending from the wall. The orifice is selectively sealed at one end by the float valve and is selectively sealed at the opposite end by the head valve. The covering portion of the umbrella valve displaceably overlies the vacuum vent for preventing passage of liquid fuel and fuel vapor through the vent when the force against the covering portion is generally positive relative to the fuel vent and covering portion. The covering portion allows passage of liquid fuel and fuel vapor through the vent when the force on the covering portion is greater than the resisting force of the covering portion there against.

21 Claims, 4 Drawing Sheets

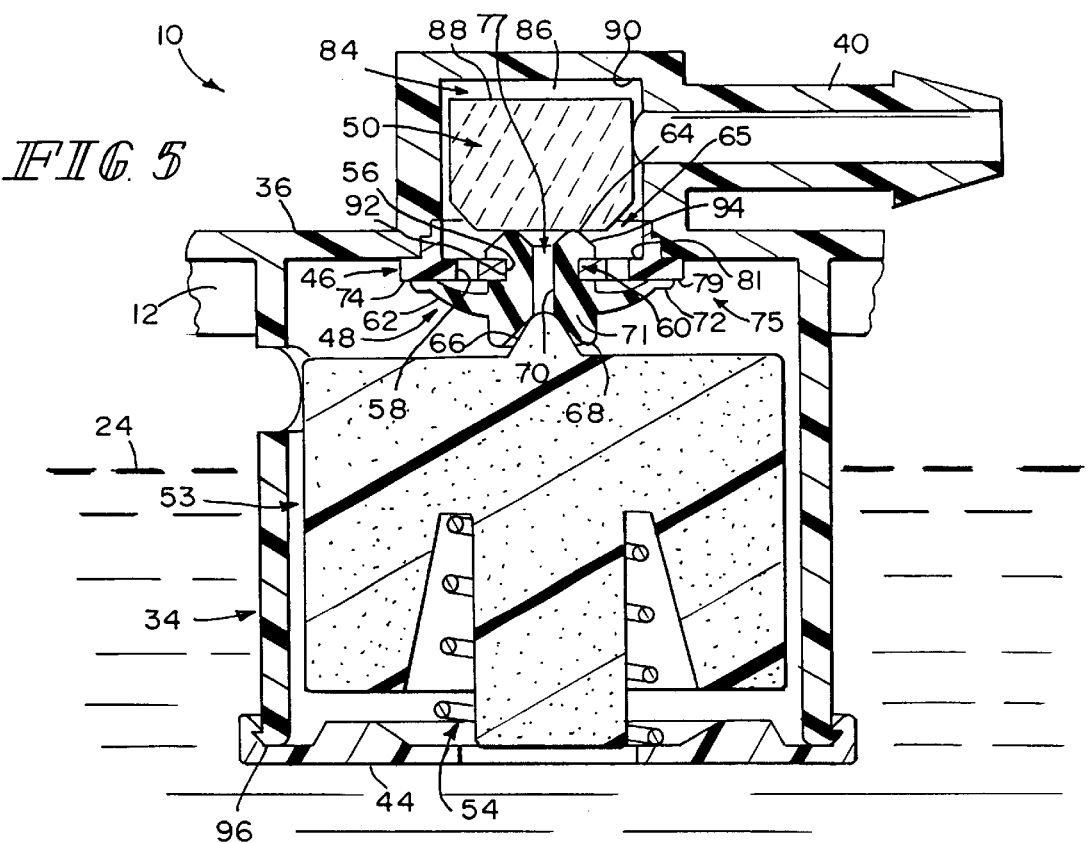
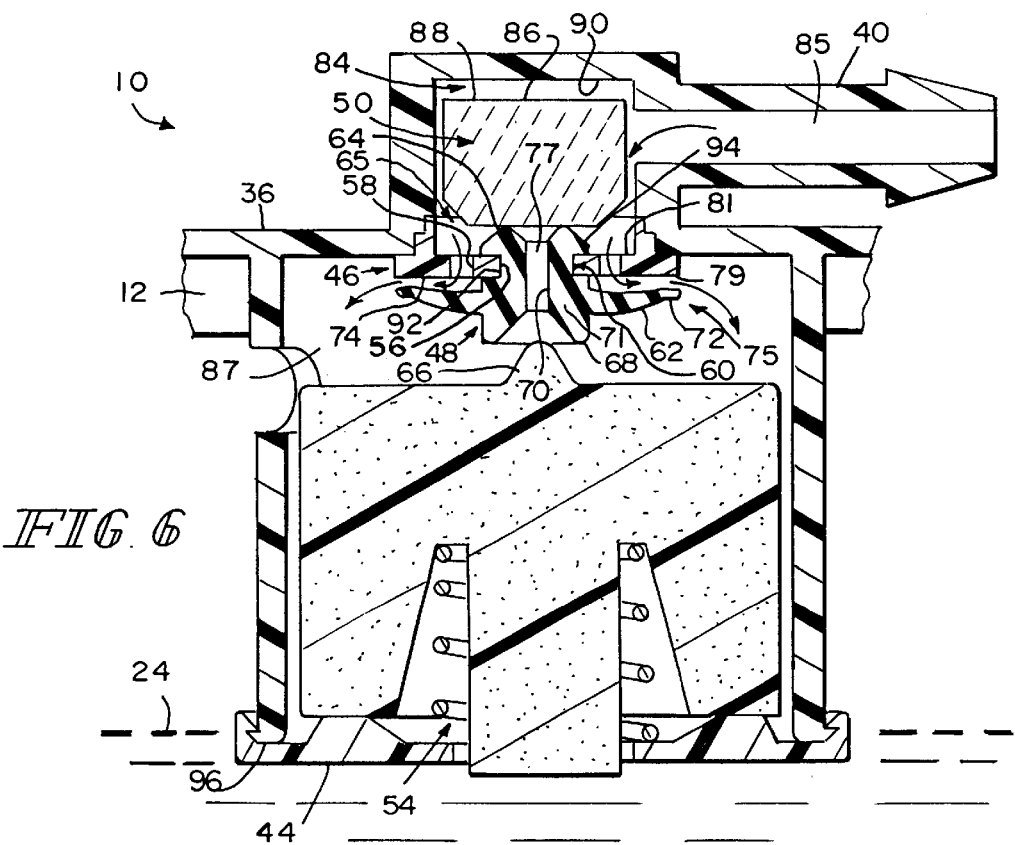

FUEL TANK VENT CONTROL VALVE

CROSS-REFERENCE TO RELATED APPLICATIONS

This application is a non-provisional application which claims the benefit of U.S. Provisional Application No. 60/241,676, filed Oct. 19, 2000.

BACKGROUND OF THE INVENTION

The present invention relates to fuel system valves, and particularly to a flow control valve for regulating the discharge of pressurized fuel vapor from a fuel tank. The present invention also relates to such valves which are tank-mounted for venting fuel vapor from various regions inside a vehicle fuel tank to a vapor-recovery canister or other destination. The present invention also relates to a tank valve which prevents liquid fuel within a tank venting system from entering and contaminating a vapor-recovery canister within the system.

Is it well understood that significant quantities of fuel vapor can escape from a fuel tank through the filler neck to the atmosphere during the refueling of motor vehicles. Early attempts to control the vapor escape focused upon control devices fitted to a fuel-dispensing pump nozzle connected to a service station fuel pump. Later, control devices mounted directly on-board the vehicle were developed. See, for example, U.S. Pat. No. 4,816,045 to Szlaga et al., relating to a vapor-recovery system mounted on the fuel tank filler neck. Tank venting systems which mount to a fuel tank have also been developed as shown, for example, in U.S. Pat. No. 5,156,178 to Harris.

In additional to controlling vapor escape, well-designed tank venting systems also assist in controlling the amount of liquid fuel which can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, a tank venting system is usually provided with a "fill-limit" control system which assists in triggering the nozzle shut-off mechanism when the level of liquid fuel in the fuel tank has risen to a predetermined level. See, for example, the fill-limit control system disclosed in U.S. Pat. No. 4,816,045 to Szlaga et al.

It has also long been recognized that fuel vapor is generated in the fuel tank during operation of the vehicle, for example, by evaporation or by sloshing of the liquid fuel against the walls of the tank. Excessive pressure can build up in the fuel tank as a result of the newly formed fuel vapor unless control devices are provided to vent the fuel vapor from the fuel tank during vehicle operation. Such valves have been referred to as "run-loss" valves or tank venting rollover valves because they handle the fuel vapor loss during vehicle run and are capable of preventing liquid fuel carryover during vehicle rollover.

Vehicle fuel systems are known to include pressure-relief valves mountable on either fuel tanks or filler necks. In general, the venting portion of these conventional valve assemblies has included a pressure-relief valve positioned in a vent passageway having a surface exposed to the pressure in the tank and a yieldable control spring urging the pressure-relief valve normally to close the vent passageway. In response to a predetermined superatmospheric pressure, the pressure-relief valve is urged in opposition to the control spring to open the vent passageway.

Examples of valves and systems as discussed above include U.S. Pat. Nos. 5,687,778 to Harris; 5,666,989 to Roetker; 4,760,858 to Szlaga and 4,742,844 to Szlaga.

Features of the invention will become apparent to those skilled in the art upon consideration of the following detailed description of preferred embodiments exemplifying the best mode of carrying out the invention as presently perceived.

BRIEF DESCRIPTION OF THE SEVERAL VIEWS OF THE DRAWINGS

The detailed description particularly referring to the accompanying figures in which:

FIG. 5 is a sectional view as shown in FIGS. 3 and 4 in which liquid fuel admitted during tank refueling has risen to a level high enough in the fuel tank to raise a float valve to close a vent aperture entry port in the umbrella valve; and FIG. 6 is a view similar to FIG. 5 showing that a web portion of the umbrella valve can move to a vacuum-relief position when sufficient vacuum conditions develop inside the fuel tank to allow atmospheric air to move into the fuel tank past the umbrella portion of the seal to relieve subatmospheric conditions inside the tank.

DETAILED DESCRIPTION OF THE DRAWINGS

Figure 1:
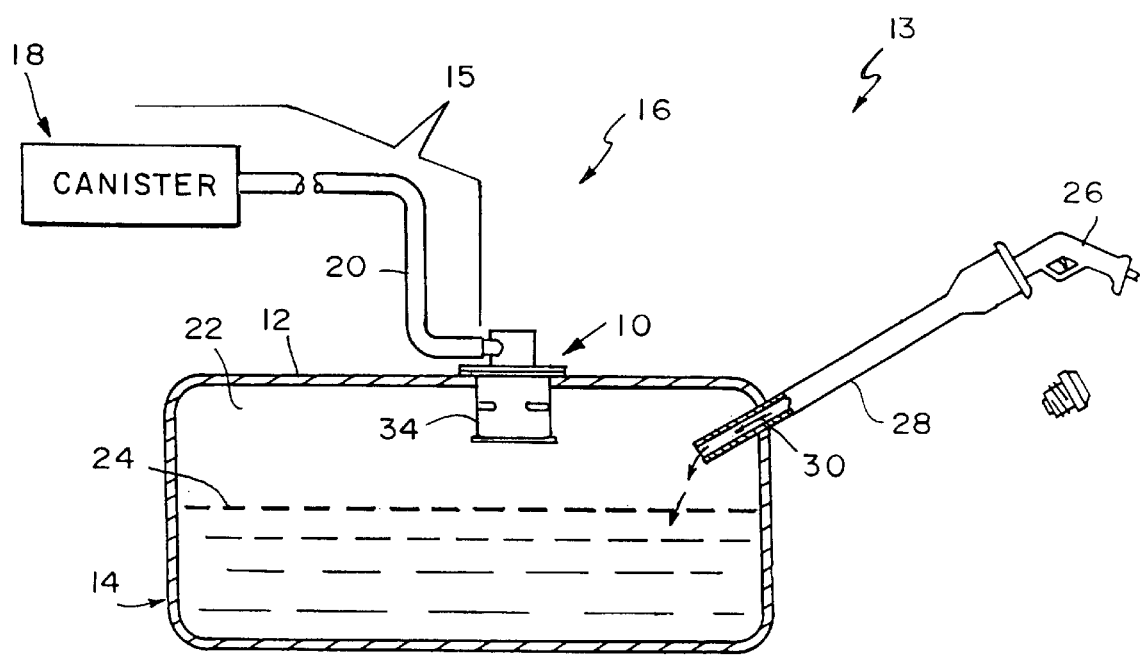
FIG. 1 is a diagrammatic sectional view of a tank provided with a filler neck and a tank venting system including a fuel tank vent control valve, which is coupled to a vapor-recovery canister mounted onboard a vehicle.

While the present invention may be susceptible to embodiment in different forms, there is show in the drawings, and herein will be described in detail, an embodiment with the understanding that the present description is to be considered an exemplification of the principles of the invention and is not intended to limit the invention to that as illustrated and described herein.

In the embodiment illustrated in the figures, a tank vent control valve 10 is mounted on a wall 12 of a fuel tank 14. The tank vent control valve or vent valve 10 is part of a fuel containing system 13 which includes a tank venting system 16. The tank venting system 16 includes a vapor recovery system 15 and the tank vent control valve 10. The vapor recovery system 15 has a vapor-recovery canister 18 connected to the tank vent control valve 10 by conduit 20. Vapor which accumulates in a vapor space 22 of a portion of liquid fuel 24 within the tank 14 is conducted through the tank vent control valve 10 through the conduit 20 to the vapor-recovery canister 18. Also, during a refueling operation in which a filler nozzle 26 is inserted into a filler neck 28 to deliver liquid fuel 30 to the tank 14, vapor is vented through the valve 10 and conducted through the tank venting system 16 to prevent escape to the ambient environment.

Figure 2:
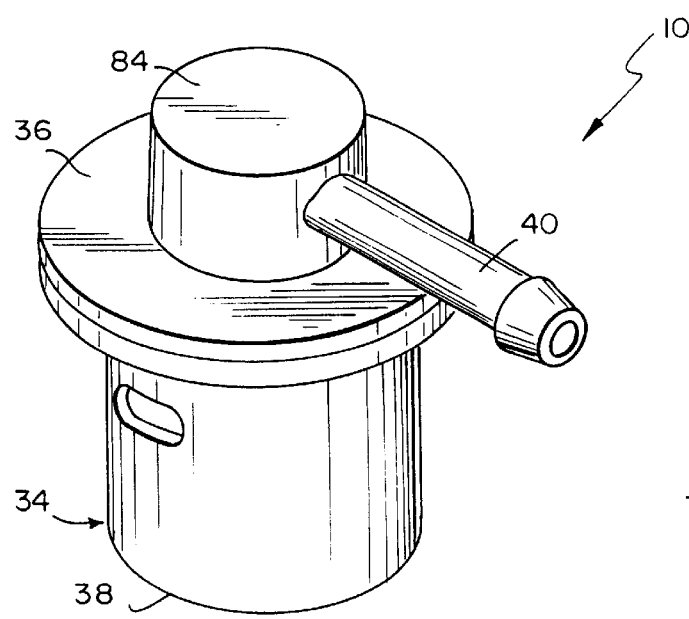
FIG. 2 is an exploded perspective view of the components of the fuel tank vent control valve shown diagrammatically in FIG. 1.
Figure 2:
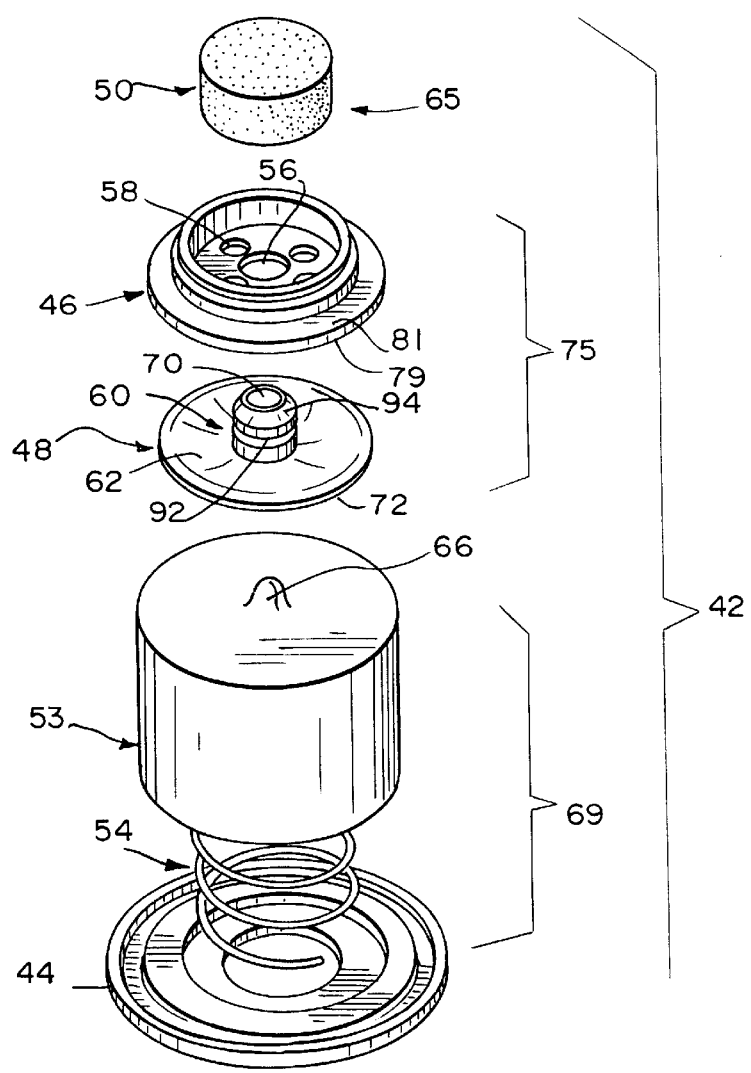

The tank vent control valve 10 is shown in greater detail in the exploded and sectional views of FIGS. 2–6. FIG. 2 provides an exploded perspective view of the components in the tank vent control valve 10. The valve includes the valve housing or housing 34 having an upper portion 36 and a lower portion 38. A fuel vapor outlet 40 extends from the upper portion 36. A series of components comprising a sealing assembly 42 are contained in the valve housing 34 and retained therein by a retainer cover 44.

The sealing assembly 42 includes a valve plate 46 with an umbrella valve or control valve 48 carried thereon. The umbrella valve 48 as shown and described is a single-piece structure formed of a suitable flexible material such as an elastomeric material. A head valve 50 in the form of a displaceable weight is positioned on one side of the valve plate 46 and the umbrella valve 48 and a float valve 69 are positioned on the other side of the plate 46. The float valve 69 includes a float body 53 and a biasing member or spring 54. The float valve 69 operates generally in accordance with known float and spring principles as applied to tank vent valves.

The valve plate 46 is generally formed of a rigid material and includes an opening 56 and one or more vacuum vents 58. A stem 60 of the umbrella valve 48 extends through the opening 56 of the valve plate 46. A web portion or cover portion 62 extends from the stem 60 to controllably cover the vacuum vents 58 as described in greater detail herein below. The cover portion 62 is flexible and selectively displaceable away from and towards the plate 46. The umbrella valve 48 and vents 58 generally define a vacuum relief valve 63.

Figure 3:
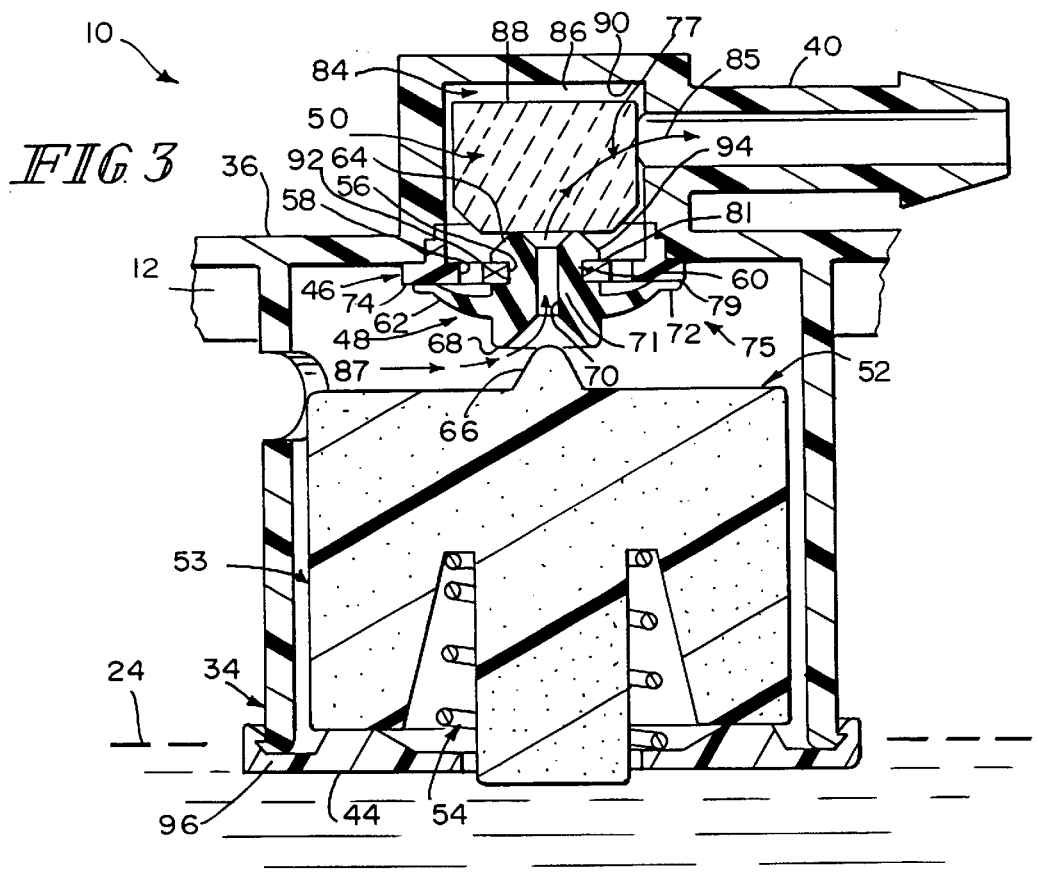
FIG. 3 is a sectional view of an assembled version of the fuel tank vent control valve showing in FIG. 2 including a one-piece umbrella valve mounted on a plate coupled to a portion of a valve housing and showing a head valve resting on a valve seat provided on a vent aperture exit port on an upstream portion of the umbrella valve.
Figure 4:
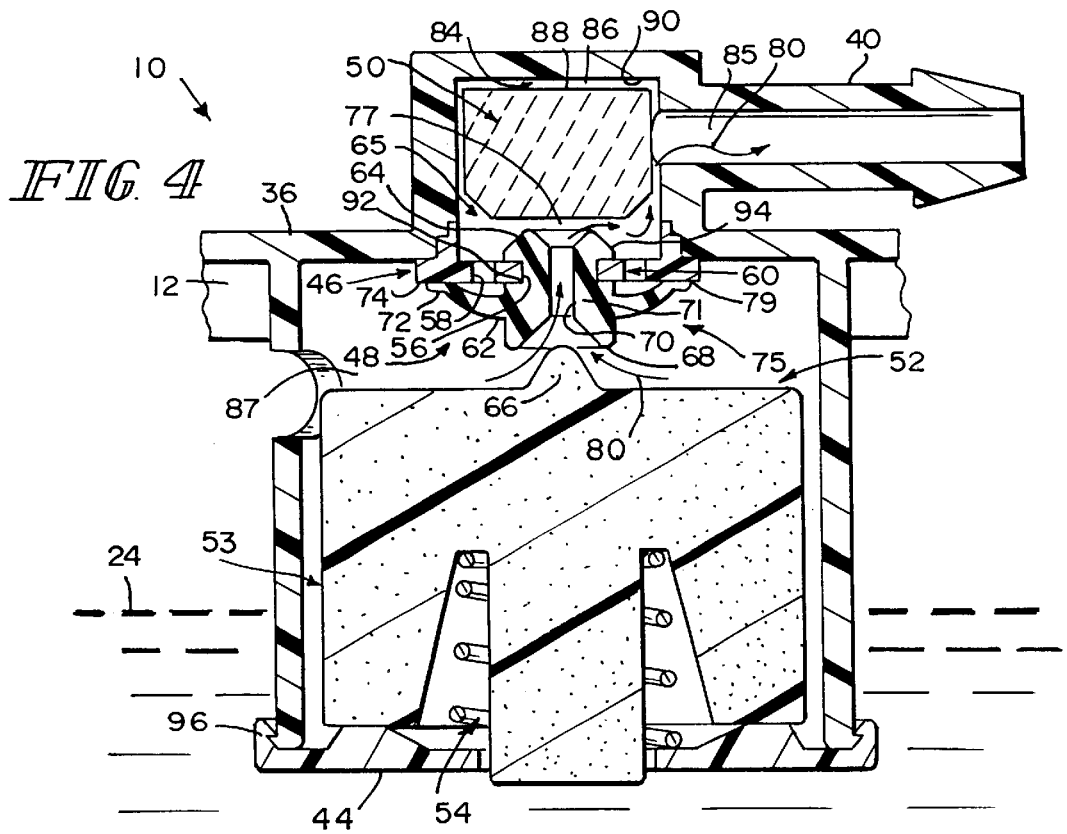
FIG. 4 is a sectional view as shown in FIG. 3 in which the head valve has been displaced, allowing pressurized fuel vapor in the tank to flow through an aperture in the umbrella valve past the head valve and to the vapor-recovery canister.

As shown in FIGS. 3, 5 and 6, the head valve weight 50 is positioned and retained in the valve housing 34 to seal against a head valve seat 64 of the umbrella valve 48 under certain conditions. The weight 50 and seat 64 generally define a head valve 65. As shown in FIG. 5, a nipple 66 of the float 52 is sized and dimensioned to seal within a float valve seat 68 on the umbrella valve 48 under certain conditions. The float 53, biasing member 54, and seat 68 generally define a float valve 69. A vent aperture, passage or orifice 70 is defined by a wall 71 of the stem 60 extending through the head valve seat 64 and the float valve seat 68. As shown in FIGS. 3, 4 and 5, at least an outer rim portion 72 of the web 62 is sized and dimensioned to selectively seal against a surface 74 of the valve plate 46.

The umbrella valve or control valve 48 and the valve plate 46 define a control valve assembly 75. The control valve assembly 75 can be formed of two pieces or structures (46, 48) as shown in the view of FIG. 2 or may be formed as a single piece structure. The single control valve assembly 75 structure can be formed by over-molding elastomeric material forming the umbrella valve 48 on a generally rigid valve plate 46. Alternatively, a single piece control valve assembly 75 could be formed of an elastomeric material or a suitably rigid material providing the cover portion 62 having the desired resilient or flexible characteristics as described in the present application. Also, it should be noted that the valve plate 46 could be formed as a portion of the housing at least one vacuum vent 58 is formed through the valve plate 46 portion of the housing 34.

The housing 34 communicates with the fuel tank 14 (FIG. 1) by extension into the internal cavity namely the vapor 22.

The housing 34 also communicates with the vapor recovery system 15 as a result of the connecting conduit 20 attached to the vapor recovery cannister 18. The housing 34 defines a path 77 between the fuel tank 14 and the vapor recovery system 15. The path 77 defines a flow path for fuel vapor to pass from the tank 14 for capture by the vapor recovery cannister 18. The valve plate 46 is positioned in the flow path 77 thereby requiring vapor passing from the tank 14 to the vapor recovery system 15 to flow therethrough.

The valve plate 46 defines a first side 79 of the path 77 communication with the fuel tank 14 and a second side 81 of the path 77 communicating with the vapor recovery system 15. The control valve 48 is generally positioned on the first side 79 of the of the valve plate 46 with the stem 60 extending through the opening 56. The float valve 69 and head valve 65 control the flow of the portion of the path 77 passing through the orifice 70. The float valve is positioned for controllably covering the first end or float valve seat 68 of the orifice 70. The head valve 50 positioned for controllably covering the second end or head valve seat 64 of the orifice.

The umbrella valve or control valve 48 is positioned over the first side 78 of the valve plate 46 so that the flexible cover portion 62 extends over the vacuum vents 58. When a force directed toward the first side 79 of the plate 46 is positive relative to the covering portion 62 and vent 58, the cover portion 62 will prevent or block the flow of liquid and vapor through the vent 58. In other words if the pressure or other force, such as sloshing liquid fuel, create a force which positively presses or places the cover portion 62 against the plate 46, the cover portion 62 will prevent the liquid or vapor from passing through the vent 58. When the force directed toward the second side 81 of the plate 46 is positive relative to vacuum vent 58 and cover portion 62, the force will disengage the cover portion 62 over the corresponding vacuum vent 58 allowing vapor to flow from the second side 85 of the path 77 to the first side 87 of the path 77. In other words, if the pressure or other forces such as a buildup of liquid fuel or vapor condensate, presses against or is otherwise directed towards the second side 81 to sufficiently to disengage the corresponding cover portion 62 from the valve plate 46, the liquid, vapor or both will be allowed to pass through the vacuum vent 58 towards the fuel tank 14.

Starting from the condition as shown in FIG. 1 in which fuel 30 is introduced into the tank 14, we discuss the steps, conditions, additional structures and details relating to the tank vent control valve 10 as generally described hereinabove. Starting from the condition as shown in FIGS. 1 and 3, fuel 30 is introduced into the tank 14. As shown in FIG. 4, during the filling operation or at any time when the level of the liquid fuel 24 in the tank 14 results in disengagement of the float 53 from the umbrella valve 48, vapors 80 are allowed to pass by the nipple 66 through the passage 70 and out through the fuel vapor outlet 40. This is because the nipple 66 is disengaged from the float valve seat 68 to allow venting of the vapor space 22 in the tank 14. It should be noted that the sealing structures 66 and 68 on the float 53 and umbrella valve 48, respectively, could be provided in different shapes or dimensions to achieve the same or substantially similar sealing function. For example, the nipple 66 may be eliminated resulting in a generally flat surface engaging a cooperatively formed float valve seat 68 to achieve the desired sealing characteristics.

During the operating conditions in which the float 53 engages the umbrella valve 48, vapor or in the case of a rollover condition, fuel, will not be allowed to pass through the passage 70. In the condition shown in FIG. 4, where the float 53 is disengaged from the umbrella valve 48 without rollover, when the level of fuel 24 in the tank 14 or pressure in the vapor space 22 results in a disengagement of the float 53 from the umbrella valve 48 and when the pressure inside the vapor space 22 is greater than the downward force exerted by the head valve weight 50, vapors 80 will be allowed to pass through the passage 70 of the umbrella valve 48, around the head valve weight 50 and through the fuel vapor outlet 40. When the pressure inside the vapor space 22 is less than the force exerted by the head valve weight 50 against the corresponding head valve seat 64, vapors will not be allowed to pass from the vapor space 22. This is the condition shown in FIG. 3.

As shown in FIG. 5, when the fuel level 24 in the tank 14 has risen to a condition whereby the float 53 rises to engage the nipple 66 in the seat 68, vapor and liquid, in the case of a rollover, are prevented from passing through the passage 70. Also shown in FIG. 5, the pressure within the vapor space 22 is less than the downward force of the weight 50 against the seat 64. As such, no passage of vapor will occur around the weight 50. Additionally, as shown in FIG. 5, the pressure in the conduit 20 and vapor-recovery canister 18 is less than or equal to the sealing force of the web portion 62 of the umbrella valve 48 against the valve plate 46.

As shown in FIG. 6, when the pressure in the canister 18 or conduit 20 connected to the fuel vapor outlet 40 is greater than the sealing force of the web portion 62 of the umbrella valve 48 against the valve plate 46, the pressure differential causes disengagement of at least a portion of the outer rim portion 72 of the web 62 from the surface 74. In other words, when there is a relative vacuum in the vapor space 22, the web 62 is displaced into a vacuum relief position away from the surface 74. The umbrella valve 48 is formed to produce a normally closed condition against the surface 74 but, due to the flexible properties of the material used to form the structure allows for displacement. When the web 62 is displaced against the closure force, vapor can travel through the vacuum vents 58, past the web 62 and into the vapor space 22 of the tank 14.

It should also be noted that the head valve weight 50 is retained within a head valve cavity 84 of the upper portion 36 of the housing 34. The weight 50 is sized and dimensioned relative to the interior dimensions of the cavity 84 to provide a space 86 between an exterior surface 88 of the weight and an interior surface 90 of the cavity 84. This dimensional differential is provided to allow for passage of vapors 80 therearound in the aforementioned conditions. Additionally, the dimensions of the cavity 84 and the shape and dimensions of the weight 50 are such as to prevent disengagement or disorientation of the weight 50 relative to the cavity 84. In this regard, the weight 50 could be another shape, such as spherical, with the cavity 84 cooperatively shaped to retain the weight relative to the head valve seat 64 and to allow passage of vapor therearound.

The stem 60 includes an annular recess 92 and an outwardly extending flange 94. The structure of the recess 92 and flange 94 allow the umbrella valve 48 to be engaged in the opening 56 without additional fasteners or retaining structures.

As briefly discussed above, there may be a "roll-over" condition in which the vehicle containing the tank 14 and tank venting system 16 is turned over. Under these conditions, it is desirable to seal all passages, vents and other openings to prevent the passage of fuel therethrough. As such, in a rollover condition, the float 53 is inverted and sealed against the float valve seat 68. Sealing of the float 53 against the seat 68 eliminates the need for sealing at the head valve 50 and seat 64. However, the vacuum vents 58 must be sealed in such a rollover condition. The outwardly extending structure of the web 62 of the umbrella valve 48 can be sized and dimensioned so as to positively seal in such a rollover condition. In this regard, the web 62 as shown herein has a generally arcuate shape. The arcuate shape of the web 62 provides a positive spring loaded condition to seal the web against the surface 74. This spring force also provides a resistance force against which the vapor 80 pressure must act to overcome in order to allow passage from the canister 18 to the vapor space 22. In other words, vapor will displace the web 62 when the pressure of the vapor is greater than the combination of the spring force in the web 62 and the pressure in the vapor space 22. The arcuate shape and spring force can be derived from the as formed structure of the web 62. The dimensional characteristics relative to the material characteristics of the umbrella valve 48 are such that the spring force is preloaded when the stem 60 in installed into the opening 56.

In use, the tank vent control valve 10 is assembled with the weight 50 retained in the head valve cavity 84. The valve plate 46 is attached over the head valve cavity 84 with the stem 60 of the umbrella valve 48 installed through the opening 56 of the valve plate 46. The float 53 and spring 54 are installed in the lower portion 38 of the housing 34 to position the nipple 66 for engagement with the valve seat 68. The retainer 44 is attached to the housing 34 using a snap-fit structure 96 of known design. The assembled tank vent control valve 10 is installed into a fuel tank 14 and attached via the conduit 20 to the canister 18.

While a preferred embodiment of the present invention is shown and described, is envisioned that those skilled in the art may devise various modifications and equivalents without departing from the spirit and scope of the invention as recited in the following claims.

I claim:

1. A vent valve for use with a fuel containing system including a fuel tank and a vapor recovery system, said vent valve comprising:

a housing for communicating with at least said fuel tank and said vapor recovery system;

said housing defining a path between said fuel tank and said vapor recovery system;

a float valve operatively associated with said housing, said float valve being responsive to the presence of fuel in said fuel tank;

said housing having at least one vacuum vent positioned generally in said path;

an umbrella valve carried on said housing positioned between said fuel tank and said vapor recovery system;

said umbrella valve defining an orifice extending there through, said orifice communicating with said fuel tank and said vapor recovery system;

said orifice having a first end defining an entry port positioned toward to said fuel tank and a second end defining an exit port positioned toward said vapor recovery system;

said float valve being positioned proximate to said umbrella valve for selectively covering said entry port of said orifice; and said umbrella valve having a covering portion at least partially positioned proximate to said fuel tank displaceably overlying said at least one vacuum vent for preventing passage of liquid fuel and fuel vapor there through when the pressure in the fuel tank is at least positive relative to said at least one vent valve and covering portion, and allowing passage of liquid fuel and fuel vapor through said vent when the pressure in the tank is at least negative relative to said at least one vent valve and covering portion.

2. The vent valve of claim 1, further comprising a head valve positioned proximate to said umbrella valve for selectively covering said exit port of said orifice.

3. The vent valve of claim 1, said umbrella valve being formed of an elastomeric material.

4. The vent valve of claim 1, wherein said umbrella valve includes a wall generally defining said orifice, and including said covering portion generally extending outwardly from an external surface of said wall.

5. The vent valve of claim 1, wherein said head valve is a weighted valve member retained in said housing for resting on said exit port of said orifice.

6. The vent valve of claim 1, wherein said float valve includes a biasing member and a float body retained in said housing for selectively covering said entry port of said orifice.

7. A fuel system valve comprising:
a housing defining a path having a first side and a second side;
a float valve operatively associated with said first side of said path;
a head valve operatively associated with said second side of said path;
said housing defining at least one vacuum vent communicating with said first side and said second side of said housing;
a control valve carried on said housing and positioned between said first side and said second side of said path for controlling communication of liquid and vapor through said path;
said control valve defining an orifice there through, said orifice communicating with said first side and said second side of said path;
said orifice having a first end positioned for communicating with said first side of said path and a second end positioned for communicating with said second side of said path;
said float valve being positioned for controllably covering said first end of said orifice;
said head valve being positioned for controllably covering said second end of said orifice; and
said control valve having a covering portion on said first side of said path to displaceably overlie said at least one vacuum vent for preventing passage of liquid and vapor through said vent when a force on said first side of said path is positive relative to said at least one vacuum vent and covering portion, and for allowing passage of liquid and vapor through said vacuum vent when the force on said second side of said path is positive relative to said at least one vacuum vent and covering portion.

8. The fuel system valve of claim 7, wherein at least said covering portion of said control valve is formed of an elastomeric material for flexibly, selectively covering and being displaced from said at least one vacuum vent.

9. The fuel system valve of claim 7, wherein said control valve is formed as a single-piece structure having elastomeric surfaces for sealing against the surfaces in said fuel system valve which it contacts.

10. The fuel system valve of claim 7, wherein said control valve is molded as a single-piece body structure formed of an elastomeric material.

11. The fuel system valve of claim 7, wherein said control valve includes a wall having an internal surface generally defining said orifice, and including said covering portion generally extending outwardly from an external surface of said wall.

12. The fuel system valve of claim 7, wherein said head valve is a weighted valve member retained in said housing for resting on said second end of said orifice.

13. The fuel system valve of claim 7, wherein said float valve includes a biasing member and a float body retained in said housing for selectively covering said first end of said orifice.

14. A control valve assembly for use in combination with a fuel system having a fuel tank and a vapor recovery system, said fuel system defining a flow path from said fuel tank to said vapor recovery system, said vapor recovery system having a tank valve assembly positioned in said flow path, said tank valve assembly including a valve housing with a float valve positioned proximate said fuel tank and a head valve positioned in said flow path generally upstream from said fuel tank, said control valve assembly positioned in said flow path and comprising:
a valve plate having first side positioned proximate said float valve and a second side positioned proximate said head valve, said valve plate at least partially intersecting said flow path;
said valve plate defining at least one vacuum vent therethrough;
an umbrella valve carried on said plate for controlling communication of liquid and vapor between said first side and said second side of said valve plate;
said umbrella valve and said valve plate defining an orifice there through, said orifice communicating with said first side and said second side of said plate;
said orifice having a first end positioned for contact with said float valve and second end positioned for contact with said head valve; and
said umbrella valve having a covering portion on said first side of said valve plate to selectively displaceably overlie said at least one vacuum vent for preventing passage of liquid and vapor through said vent when a force directed toward said first side of said valve plate is positive relative to said at least one vacuum vent and covering portion, and allowing passage of liquid and vapor through said vacuum vent when the force directed toward said second side of said valve plate is positive relative to said at least one vacuum vent and covering portion.

15. The control valve assembly of claim 14, wherein said float valve selectively seals and unseals against said first end of said orifice.

16. The control valve assembly of claim 14, wherein said head valve selectively seals and unseals against said second end of said orifice.

17. The control valve assembly of claim 14, wherein said cover portion selectively seals and unseals over said at least one vacuum vent.

18. The control valve assembly of claim 14, wherein said valve plate and said umbrella valve are two separate structures and in which said umbrella valve is attached to said valve plate to facilitate relative venting of said cover portion over said at least one vacuum vent.

19. The control valve assembly of claim 18, wherein said umbrella valve is formed of a flexible material.

20. The control valve assembly of claim 18, wherein said valve plate is formed of a generally rigid material.

21. The control valve assembly of claim 14, wherein said valve plate and said umbrella valve are formed as a single-piece structure, at least said covering portion of said umbrella valve being formed for providing flexible displacement of said cover portion relative to said valve plate.

* * * * *